United States Patent
Jordan

(10) Patent No.: US 8,352,692 B1
(45) Date of Patent: Jan. 8, 2013

(54) UTILIZING PEER-TO-PEER SERVICES WITH SINGLE INSTANCE STORAGE TECHNIQUES

(75) Inventor: Kevin Jordan, Vadnais Heights, MN (US)

(73) Assignee: Symantec Corporation, Mountain View, CA (US)

( * ) Notice: Subject to any disclaimer, the term of this patent is extended or adjusted under 35 U.S.C. 154(b) by 966 days.

(21) Appl. No.: 11/694,517

(22) Filed: Mar. 30, 2007

(51) Int. Cl.
*G06F 12/00* (2006.01)

(52) U.S. Cl. .................................. 711/162; 711/216
(58) Field of Classification Search .................. 711/162, 711/216
See application file for complete search history.

(56) References Cited

U.S. PATENT DOCUMENTS

| | | | |
|---|---|---|---|
| 6,389,433 B1 | 5/2002 | Bolosky et al. | |
| 6,513,051 B1 | 1/2003 | Bolosky et al. | |
| 6,920,537 B2 | 7/2005 | Ofek et al. | |
| 6,983,365 B1 | 1/2006 | Douceur et al. | |
| 7,200,604 B2 | 4/2007 | Forman et al. | |
| 7,310,644 B2 | 12/2007 | Adya et al. | |
| 7,359,920 B1 | 4/2008 | Rybicki et al. | |
| 7,424,514 B2 | 9/2008 | Noble et al. | |
| 7,478,113 B1 | 1/2009 | De Spiegeleer et al. | |
| 2005/0198328 A1* | 9/2005 | Lee et al. | 709/229 |
| 2005/0216813 A1* | 9/2005 | Cutts et al. | 714/752 |
| 2006/0026219 A1* | 2/2006 | Orenstein et al. | 707/204 |
| 2010/0257403 A1* | 10/2010 | Virk et al. | 714/15 |
| 2010/0274982 A1* | 10/2010 | Mehr et al. | 711/162 |

* cited by examiner

*Primary Examiner* — Hashem Farrokh
*Assistant Examiner* — Larry Mackall
(74) *Attorney, Agent, or Firm* — Rory D. Rankin; Meyertons, Hood, Kivlin, Kowert & Goetzel, P.C

(57) ABSTRACT

A system and method for storing data in a peer-to-peer network. A computer system includes interconnected hosts configured to store data segments. A first host stores a first subset of the data segments received from other hosts. The first host maintains a portion of a distributed hash table corresponding to the first subset of data segments and de-duplicates the first subset of the data segments against the remaining data segments. The distributed hash table comprises entries corresponding to the data segments, each entry including a data segment fingerprint that unambiguously identifies the corresponding data segment. The first host selects and joins a group of hosts that maintains the distributed hash table. The first host conveys data to the selected group indicating its availability to own additional entries in the distributed hash table.

20 Claims, 9 Drawing Sheets

Hash Table 310

| Primary Owner | Primary Owner Attributes | Secondary Owner | Secondary Owner Attributes | Segment Fingerprint | Attributes | Data Segment |
|---|---|---|---|---|---|---|
| Host 221 | Mobile PC, 30 GB | | | 310 | 350 | 370 |
| | | | | 311 | 351 | 371 |
| | | | | 312 | 352 | 372 |
| | | | | 313 | 353 | 373 |
| | | | | 314 | 354 | 374 |
| Host 224 | Server, 400 GB | Host 224 | Server, 400 GB | 315 | 355 | 375 |
| | | | | 316 | 356 | 376 |
| | | | | 317 | 357 | 377 |
| | | | | 318 | 358 | 378 |
| | | | | 319 | 359 | 379 |
| | | | | 320 | 360 | 380 |
| | | | | 321 | 361 | 381 |
| Host 222 | Mobile PC, 20 GB | Host 221 | Mobile PC, 30 GB | 322 | 362 | 382 |
| | | | | 323 | 363 | 383 |
| | | | | 324 | 364 | 384 |
| Host 223 | Desktop PC, 100 GB | Host 221 | Mobile PC, 30 GB | 325 | 365 | 385 |
| | | | | 326 | 366 | 386 |
| | | | | 327 | 367 | 387 |
| | | | | 328 | 368 | 388 |
| | | | | 329 | 369 | 389 |

FIG. 3

Status Table 700

| Host ID | Host Attributes | Redundancy required | Capacity | Usage |
|---------|----------------|---------------------|----------|-------|
| Host 231 | Mobile PC | Yes | 30 GB | 0.1 GB |
| Host 232 | Serve | No | 400 GB | 150 GB |
| Host 233 | Mobile PC | Yes | 30 GB | 10 GB |
| Host 234 | Desktop PC | Yes | 100 GB | 20 GB |

FIG. 7

UTILIZING PEER-TO-PEER SERVICES WITH SINGLE INSTANCE STORAGE TECHNIQUES

BACKGROUND OF THE INVENTION

1. Field of the Invention

This invention relates to computer systems and, more particularly, to protection of data within computing systems.

2. Description of the Related Art

It is common practice for individuals and enterprises to protect data that resides on a variety of computer hosts via some type of backup mechanism. For example, numerous client devices may be coupled to a network to which a backup server is also coupled. The backup server may be further coupled to one or more tape drives or other backup media. A backup agent on each host may convey data files to the backup server for storage on backup media according to a variety of schedules, policies, etc. To facilitate restoring backup files, the backup server may maintain a catalog of the files that have been stored on the backup media. When a client wishes to restore a file, the server may present a view of the catalog or a portion of the catalog from which the client may make a selection. Once the client has indicated which file is to be restored, the backup server may initiate a restoration process.

In order to minimize the size of storage pools required to store backup data, Single Instance Storage (SIS) techniques are sometimes employed at each backup location. In SIS techniques, data is stored in segments, with each segment having a fingerprint that may be used to unambiguously identify it. For example, a data file may be segmented, and a fingerprint calculated for each segment. Duplicate copies of data segments are replaced by a single instance of the segment and a set of references to the segment, one for each copy. In order to retrieve a backup file, a set of fingerprints is sent to a backup server, where it is compared to the fingerprints of data stored in a storage pool. For each matching fingerprint, a data segment is retrieved. The resulting segments are re-assembled to produce the desired file.

Unfortunately, the restoration process may be slow and inefficient. For example, because many clients typically share a small number of backup servers, the restoration process may be slowed by network latencies. Restoration may be further slowed if a slow or busy WAN link connects the backup server to its clients. Also, for tape-based backup, once a file has been identified for restoration, administrator assistance may be required to mount the particular tape that contains the desired file, increasing expense and turnaround time. In addition, files that have not been backed up are not available for restoration.

An alternative approach to data protection is to distribute responsibility for backups to hosts themselves organized into a peer-to-peer network. Peers may provide some amount of disk storage space for backup purposes. However, mobile hosts may connect and disconnect from a network on a frequent basis, making them unavailable to participate in backup operations at various times. In addition, participating hosts are likely to have a variety of capabilities. Some hosts, such as mobile computers, may have limited storage capacity. Some hosts may have slow network connections. Other hosts may have limited ability to participate in backup operations due to requirements placed on them by other applications that they may run.

In view of the above, an effective system and method for distributing and housing backup images that accounts for these issues is desired.

SUMMARY OF THE INVENTION

Various embodiments of a computer system and methods are disclosed. In one embodiment, a computer system includes a plurality of interconnected hosts configured to store a plurality of data segments. A first host is configured to convey a first subset of the data segments to other hosts and store a second subset of the data segments received from other hosts. The first host is further configured to maintain a portion of a distributed hash table, the portion corresponding to the second subset of the plurality of data segments, and de-duplicate the second subset of the data segments against the plurality of data segments. The distributed hash table comprises a plurality of entries corresponding to the plurality of data segments, each entry including a data segment fingerprint that unambiguously identifies the corresponding data segment.

In one embodiment, the first host is further configured to select and join a group of hosts from the plurality of hosts, wherein the selected group maintains the distributed hash table. The first host is further configured to convey data to the selected group indicating its availability to own one or more additional entries in the distributed hash table. The first host is still further configured to receive and store data segments from the selected group corresponding to the one or more additional entries and maintain a portion of the distributed hash table comprising entries corresponding to the received data segments. The number of additional entries an portion may be determined by a negotiation between the first host and the selected group.

In a further embodiment, the first host is configured to maintain status information indicating an available storage capacity for each host in the selected group and select a host to which to convey data segments for storage based at least in part on the status information. In a still further embodiment, the subset of the plurality of entries includes second data identifying a second host on which the corresponding data segment is stored. The selected group is configured to cause each of the data segments corresponding to the subset of the plurality of entries to be stored on the second host based on one or more attributes of a first host on which each data segment is stored.

These and other embodiments will become apparent upon consideration of the following description and accompanying drawings.

BRIEF DESCRIPTION OF THE DRAWINGS

FIG. 3 illustrates one embodiment of a distributed hash table.

FIG. 7 illustrates one embodiment of a host status table.

Figure 1:
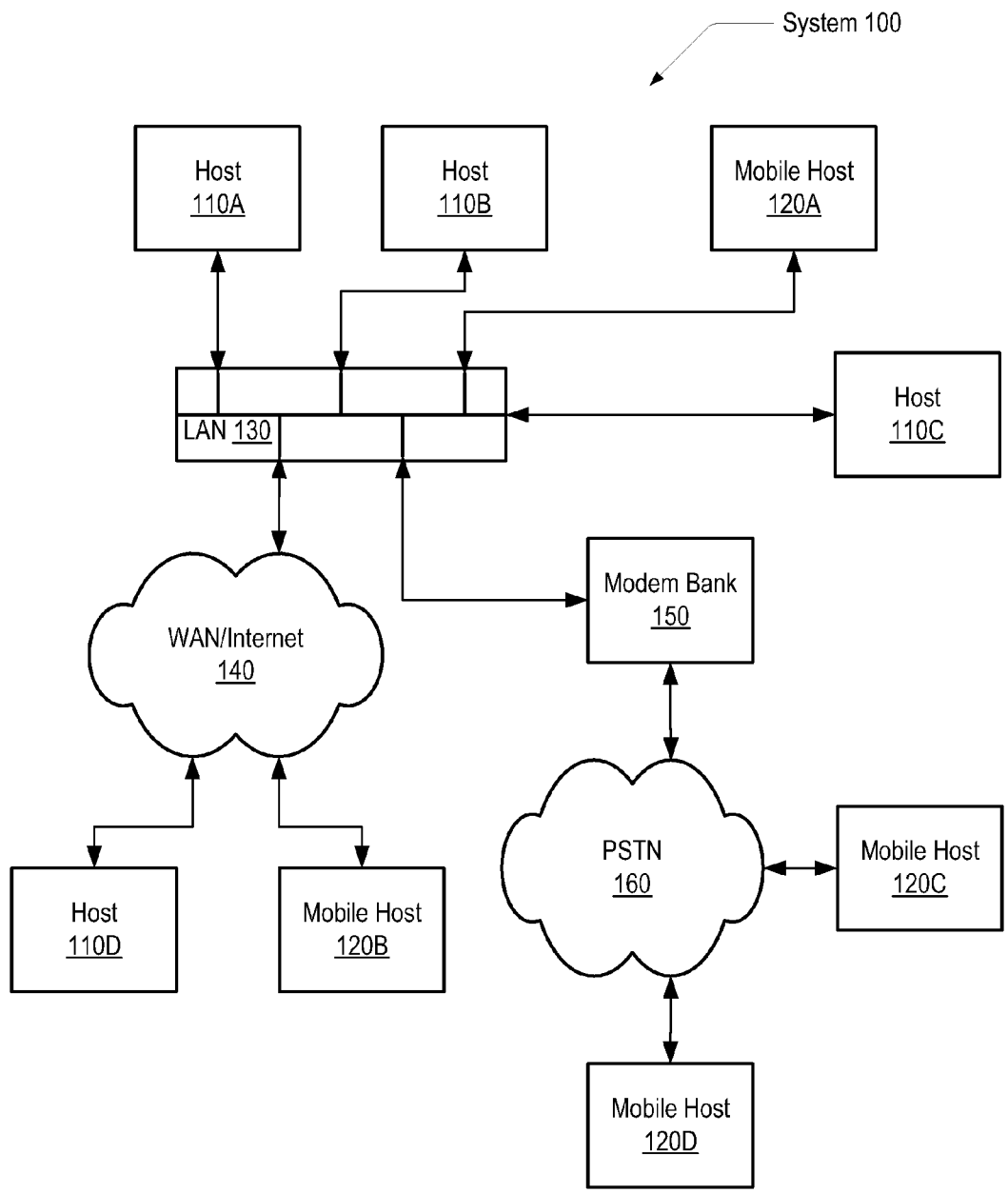
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes hosts 110A-110D and mobile hosts 120A-120D interconnected through a network that includes a local area network (LAN) 130 coupled to a wide area network WAN/Internet 140 and a modem bank 150, which may in turn be coupled to a public switched telephone network (PSTN) 160. Hosts 110A-110D are representative of any number of stationary computers. Mobile hosts 120A-120D are representative of any number of mobile client computing devices such as laptops, handheld computers, etc. Both hosts and mobile hosts may operate as peers in a peer-to-peer configuration or as clients and servers in a client/server configuration.

In alternative embodiments, the number and type of hosts, LANs, WANs, and modem banks is not limited to those shown in FIG. 1. Almost any number and combination of server, desktop, and mobile hosts may be interconnected in system 100 via various combinations of modem banks, direct LAN connections, wireless connections, WAN links, etc. Also, at various times one or more hosts may operate offline. In addition, during operation, individual host connection types may change as mobile users travel from place to place connecting, disconnecting, and reconnecting to system 100.

Figure 2:
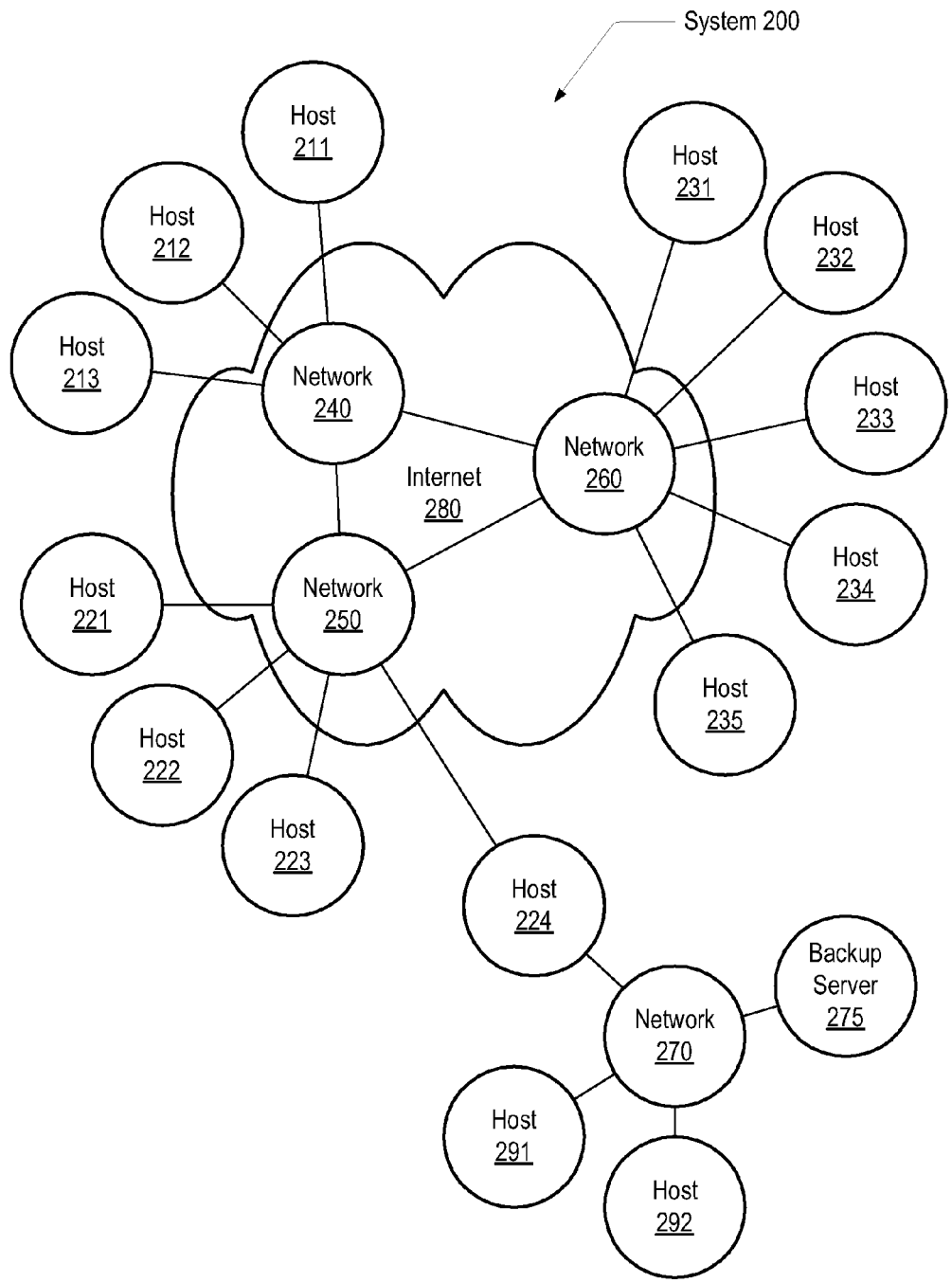
FIG. 2 illustrates one embodiment of a system of hosts organized into peer groups.

Within system 100, it may be desired to protect data associated with any of hosts 110A-110D and mobile hosts 120A-120D. In order to protect host-associated data, hosts 110A-110D and mobile hosts 120A-120D may be organized into one or more peer groups in which backup responsibilities may be shared. Turning now to FIG. 2, an illustration of one embodiment of a system 200 of hosts organized into peer groups is shown. In one embodiment, system 200 may be a logical representation of a superset of system 100. Alternatively, system 200 may be a logical representation of a subset of system 100. System 200 includes hosts 211-213, 221-224, 231-235, 291, and 292, a backup server 275, and interconnecting networks 240, 250, 260, and 270. In one embodiment, networks 240, 250, and 260 may be portions of the Internet 280. Network 240 connects host 211-213 to form a peer group. Similarly, network 250 connects host 221-224 and network 260 connects hosts 231-235 to form two additional peer groups. Host 224 may be a peer of hosts 221-223 and also part of a group that uses conventional backup techniques. In the illustrated embodiment, such a group consists of host 224, host 290, host 291, and backup server 275 interconnected by network 270. In one embodiment, network 270 may comprise a storage area network. Host 224 and other hosts that are included in both a peer-to-peer network and a conventional backup network may be referred to as supernodes.

During operation, hosts may follow one or more rules to organize themselves into peer groups. In one embodiment, when a host boots or first connects to a network, it may send a query to the network to discover other hosts and their connections. For example, a host may use IP multicast techniques to discover the topology. Other common techniques for discovering the topology of hosts and their connections will be apparent to one of ordinary skill in the art. A host may determine which group to join based on a variety of parameters such as: proximity, volume of backup data to be managed, number of other hosts already in a group, address range, etc. Once a host has joined a peer group, it may share backup data storage responsibilities. In one embodiment, the group may use a distributed hash table to maintain a record of which hosts are responsible for which data segments.

When joining a peer group, a host may advertise an amount of storage space that it is willing to make available for backup purposes. For example, a host may specify a percentage of its hard disk capacity or a fixed number of bytes of storage, etc. A host may also be given a rating that indicates to what degree it is connected to the group. For instance, a laptop computer may be given a low rating indicating that it is infrequently connected to the group, whereas a server-class computer may be given a high rating indicating that it is connected to the group twenty-four hours a day.

Within a peer group, hosts may perform data backups by sending data to other peer hosts for storage. Backup timing and frequency may depend on a variety of factors including the urgency of data protection, storage pool capacity, network connection state, and enterprise policies. In one embodiment, backups may be done according to a schedule or at other times determined by administrative policy, security policy, or to meet other requirements of an enterprise. In one embodiment, during a backup operation data may be segmented and conveyed to a peer host(s) selected by a sending host according to a set of rules or an algorithm for equitably distributing the data segments. In one embodiment, each host may maintain a table containing status information describing the storage capacity, utilization, rating, and portion of a distributed hash table maintained by each peer in its associated group. A peer may be selected based on the status table information according to one or more rules such as selecting the peer with the largest unused storage capacity, the highest connectivity rating, etc. Alternatively, storage of given segments may be determined by hosts responsible for hash table entries corresponding to the given data segments. Other selection criteria such as the least recently used peer or a round robin algorithm may be employed.

FIG. 3 illustrates one embodiment of a distributed hash table 310. In the illustrated embodiment, table 310 includes a row for each data segment stored for backup purposes in a particular peer group. In particular, table 310 includes a row for each of data segments 370-389. Each row may include fields for data segment attributes, a segment fingerprint, a primary owner, primary owner attributes, a secondary owner, and secondary owner attributes. In the illustrated embodiment, data segment attributes 350-369 correspond to data segments 370-389, respectively and segment fingerprints 310-329 correspond to data segments 370-389, respectively. Table 310 is a logical representation of the data segments that are stored within a particular peer group. Actual storage of data segments may be distributed among the hosts in the group to minimize the amount of storage required for backup purposes.

In one embodiment, the amount of storage required may be reduced by the use of single-instance storage techniques. Single-instance storage refers to storage in which data segments are de-duplicated to reduce the amount of data to be stored. De-duplication, as used herein, refers to a process that includes finding multiple copies of data entities and replacing them with a single copy of the entity plus a reference to the entity for each copy. Copies of data entities may be identified by comparing a digital fingerprint of one entity to the fingerprint of another entity. If the fingerprints match, then the two entities may be deemed to be copies of one other. A digital fingerprint for a data entity may be created by applying some function, such as a hash function, to the data entity. In one embodiment, the fingerprints may be encrypted. More particularly, a fingerprint may comprise a Message-Digest algorithm 5 (MD5) or other hash function. Alternative hash functions include Secure Hash Algorithm (SHA), a checksum, signature data, and any other suitable function, cryptographic, or otherwise, for identifying a data entity. Copies of data entities such as files or file segments may be identified by comparing a fingerprint of one entity to the fingerprint of another entity. If the fingerprints match, then the two entities are copies of each other.

Data segment attributes include information describing the associated data segments such as one or more of: data size, type, version number, ownership, permissions, modification time, error code, etc. Other data segment attributes will be apparent to those of ordinary skill in the art.

Within table 310, adjacent rows that have the same owner may be illustrated with a merged cell identifying the owner and the owner attributes. For example, host 221 is shown as the primary owner of data segments 370-373. Host 221 is further shown to be a mobile PC with 30 GB of available storage. Data segments 370-373 are also shown to have a secondary owner, host 224. Host 224 is further shown to be a server with 400 GB of available storage. Accordingly, copies of data segments 370-373 are stored on both host 221 and 224. Conversely, data segments 374-381 are shown to have a primary owner of host 224 and a secondary owner of host 224, i.e., there is only one backup copy of data segments 374-381 stored in the peer group. Hosts 222 and 221 each store a copy of data segments 382-384 and hosts 223 and 221 each store a copy of data segments 385-389. As previously noted, data segment storage may be distributed among the hosts in the group to minimize the amount of storage required for backup purposes. Accordingly, each host may maintain only those rows of hash table 310 for which it is either a primary or a secondary owner.

In alternative embodiments, table 310 may include many more rows than are shown in FIG. 3. In addition, each data segment may be stored by a primary owner alone, by a primary and a secondary owner, or by more than two owners, depending on the degree of redundant backup storage that it desired. Accordingly, in alternative embodiments, table 310 may include additional columns for additional redundant owner and owner attributes. Having described the structure and organization of one embodiment of a distributed hash table, attention will now turn to processes used by peers to join and operate a peer group.

Figure 4:
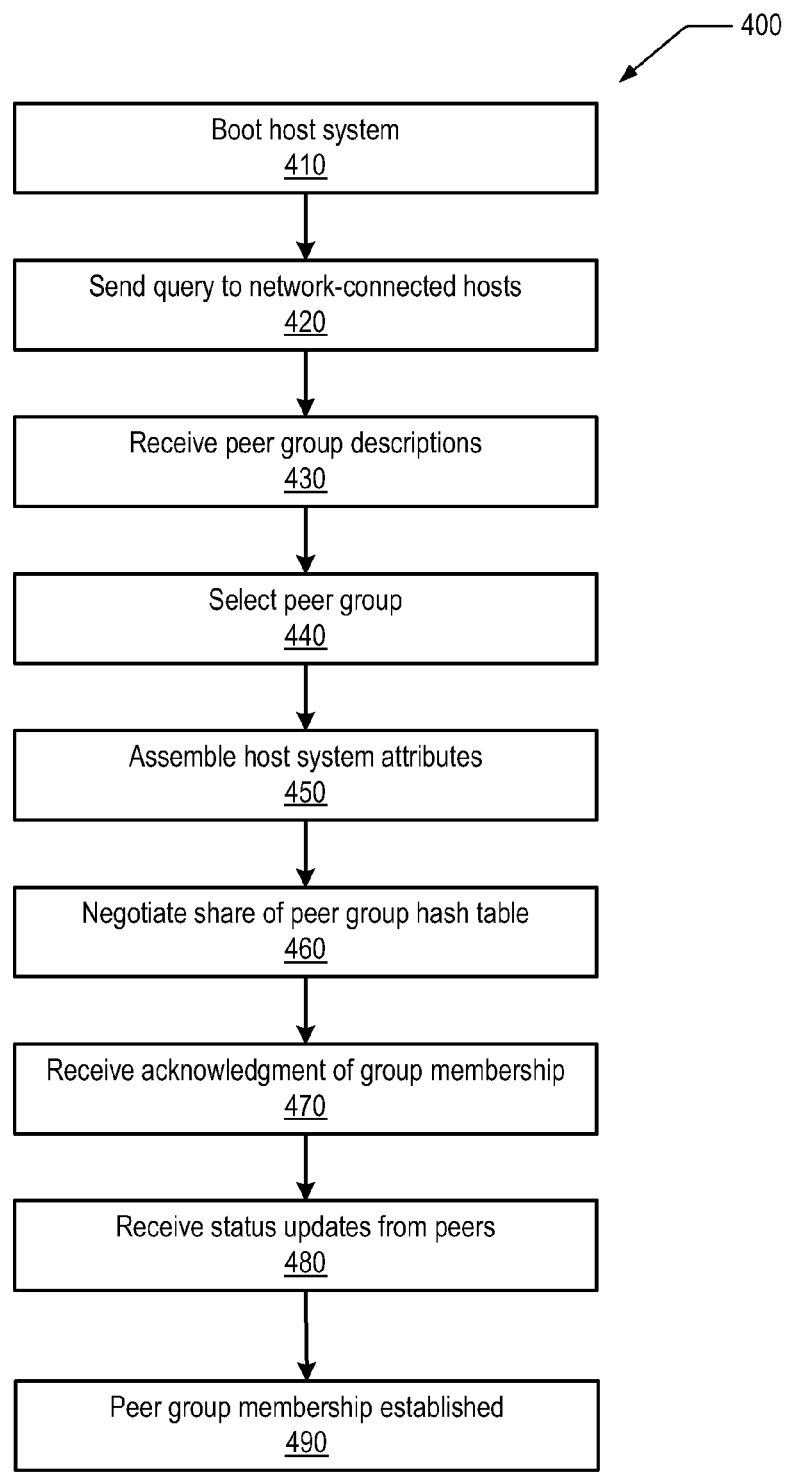
FIG. 4 illustrates one embodiment of a process that may be used by a host to join a peer group.

FIG. 4 illustrates one embodiment of a process 400 that may be used by a host to join a peer group. Process 400 may begin when a host is booted (block 410) or otherwise becomes ready to join a peer group, such as when a new network connection is established. After booting, a host may send a query via its network connection to any hosts that are also connected (block 420). As previously described, well-known querying techniques may be used such as IP multicast, etc. In response to a query, a host may receive data describing a variety of peer groups that are reachable through its network connection (block 430). By comparing the received data to one or more selection criteria, the host may select a peer group to join (block 440). A host may then assemble data including attributes that describe its capabilities to participate in backup operations (block 450). For example, the host may include host attributes such as those that were previously described regarding table 310. The host may use these attributes during a negotiation with the selected peer group for ownership of a share of the peer group's distributed hash table (block 460). Details of the negotiation process are presented below. If the negotiation succeeds, the host may receive acknowledgment of its group membership (block 470) and status updates from the other peers in the group (block 480). Otherwise, blocks 440, 450, and 460 may be repeated with other peer groups until a negotiation succeeds. Peer updates may continue to be received as long as the host remains a member of the group. Once an acknowledgment is received, peer group membership is established and process 400 is complete (block 490).

Figure 5:
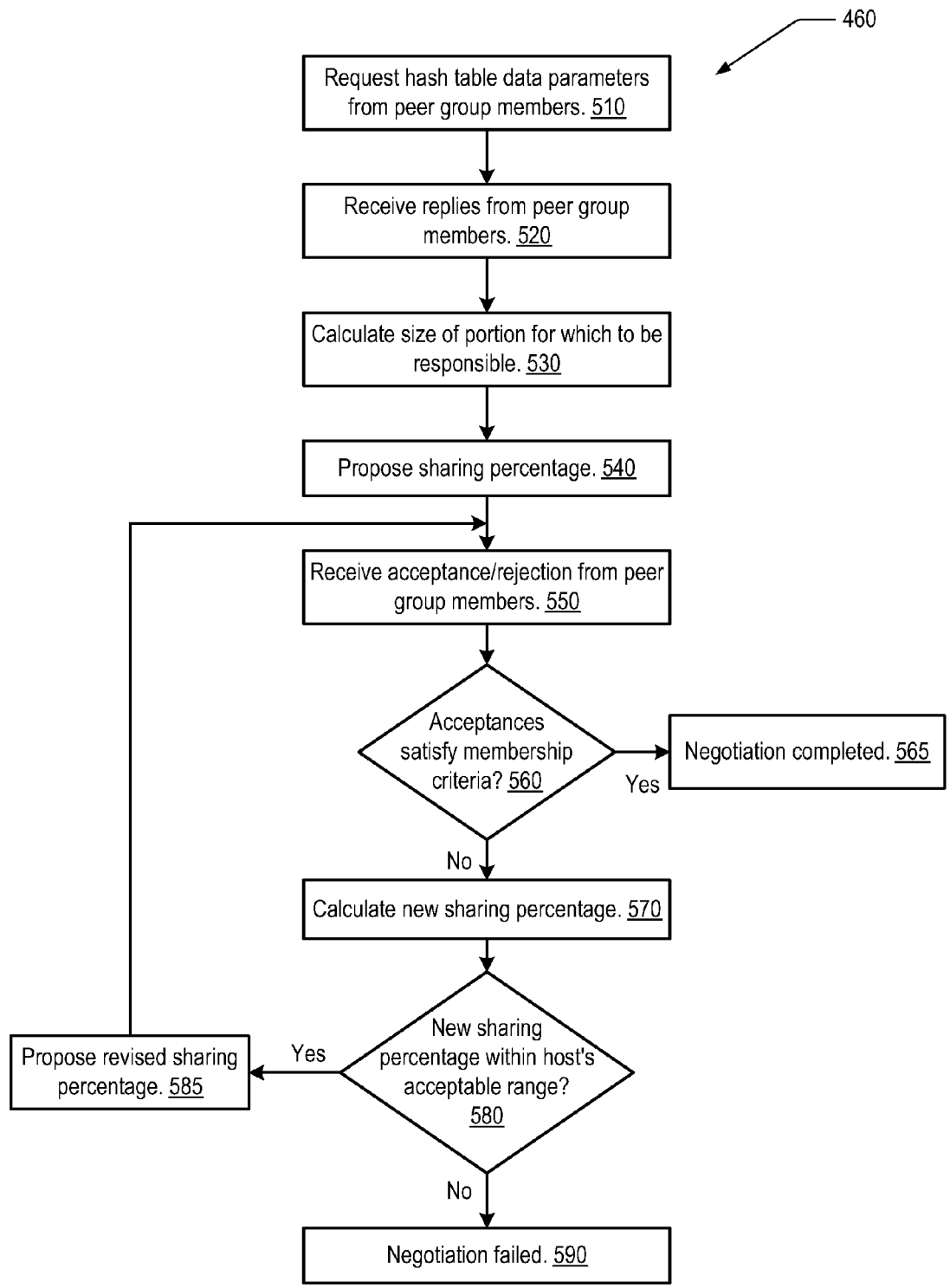
FIG. 5 is a more detailed description of one embodiment of process that may be used to negotiate a host's share of a distributed hash table.

FIG. 5 is a more detailed description of one embodiment of process 460 that may be used to negotiate a host's share of a distributed hash table. A negotiation may begin with a request by a host for hash table data from members of a selected peer group (block 510). In response, the host may receive replies from each peer (block 520) from which may be determined the size of the group's distributed hash table. For example, each peer may respond to the host with data indicating the size of its share of the group's distributed hash table and how much additional storage it is committed to provide the peer group. The host may then calculate the portion of the distributed hash table for which it is prepared to be responsible (block 530). After calculating a percentage, the host may convey the proposed percentage to the group (block 540). The host may then receive responses from each member of the group, either accepting or rejecting the proposal (block 550). The host may evaluate the received responses according to one or more rules to determine if an acceptable agreement may be reached (decision block 560). For example, a rule may specify that unanimous agreement must be reached before a new host may receive a share of the distributed hash table. Alternatively, a majority of affirmative responses may be sufficient for a new host to receive a share of the distributed hash table. If the responses satisfy the rule, the negotiation is complete (block 565). Otherwise, the host may calculate a different percentage (block 570). If the calculation yields a percentage that is within the host's acceptable range (decision block 580), then the host may convey the newly calculated percentage to the group (block 585) and return to block 550. The process blocks 550, 560, 570, and 580 may repeat until sufficient affirmative responses are received or until the host's calculation is unable to produce an acceptable percentage (decision block 580). In the latter case, the negotiation has failed (block 590). For example, the negotiation may fail if the minimum share of the distributed hash table which the peer group requires a new member to own is greater than the amount of storage that the host has available.

Figure 6:
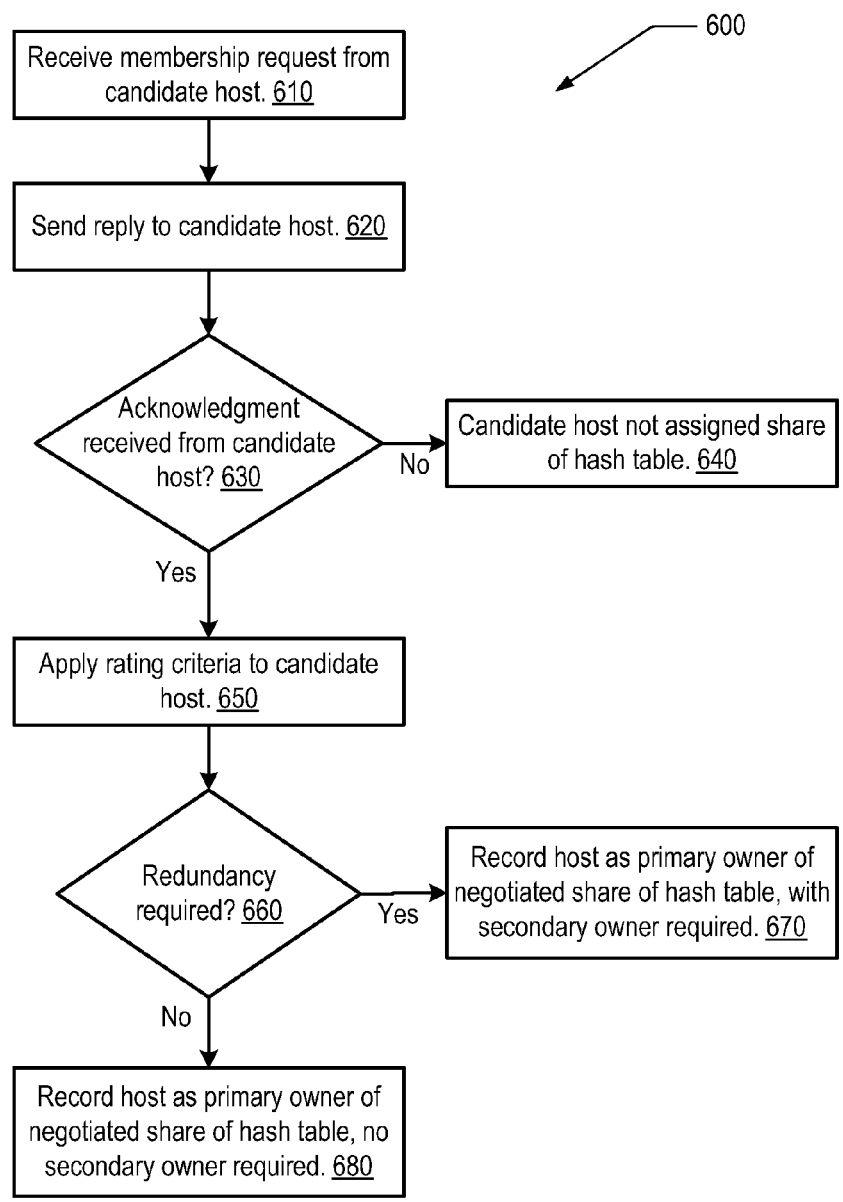
FIG. 6 illustrates one embodiment of a process that may be used to determine the degree of redundancy required for storage of backup data segments on a particular host.

FIG. 6 illustrates one embodiment of a process 600 that may be used to determine the degree of redundancy required for storage of backup data segments on a particular host. In one embodiment, each host of a peer group may use process 600 independently. In an alternative embodiment, one host may be designated to use process 600 to evaluate each new candidate host. Process 600 may begin with reception of a membership request from a candidate host (block 610) in which the candidate host proposes a willingness to own a particular portion of the group's distributed hash table. In response to the membership request, a reply may be sent to the candidate host accepting the proposed ownership (block 620). If the candidate host does not acknowledge the reply (decision block 630), no portion of the distributed hash table is assigned to it (block 640). If the candidate host acknowledges the reply (decision block 630), then one or more rating criteria may be applied to the candidate host (block 650). If the rating criteria indicate that redundancy is required for data segments stored on the candidate host (decision block 660), then the candidate host may be recorded as the primary owner of a share of the distributed hash table with a secondary owner required (block 670). Otherwise, the candidate host may be recorded as the primary owner of a share of the distributed hash table without a secondary owner required (block 680).

FIG. 7 illustrates one embodiment of a host status table 700. Table 700 may include data describing the members of a peer group, their required degree of redundancy, and their ownership of a distributed hash table. More particularly, table 700 may include a row for each host that belongs to a peer group. In the illustrated embodiment, each row includes fields for a host ID, host attributes, redundancy required, capacity, and usage. The host ID field may contain a hostname, IP address, or some other identifier through which peers may distinguish one another. The host attributes field may contain data describing the host such as the type of host (laptop, desktop, server-class, etc.), or any other relevant parameters. The redundancy required field may include yes-or-no variable such as a Boolean, a string or other variable. The capacity field may include a number of bytes of storage that the associated host is willing to devote to the backup requirements of the peer group. The usage field may include a number of bytes of storage that are currently consumed by backup data on the associated host. In an alternative embodiment, the usage field may include a value that is expressed as a percentage of the capacity field. In another alternative embodiment, the capacity and usage fields may include values expressed as a number of rows in the distributed hash table, rather than a number of bytes.

Figure 8:
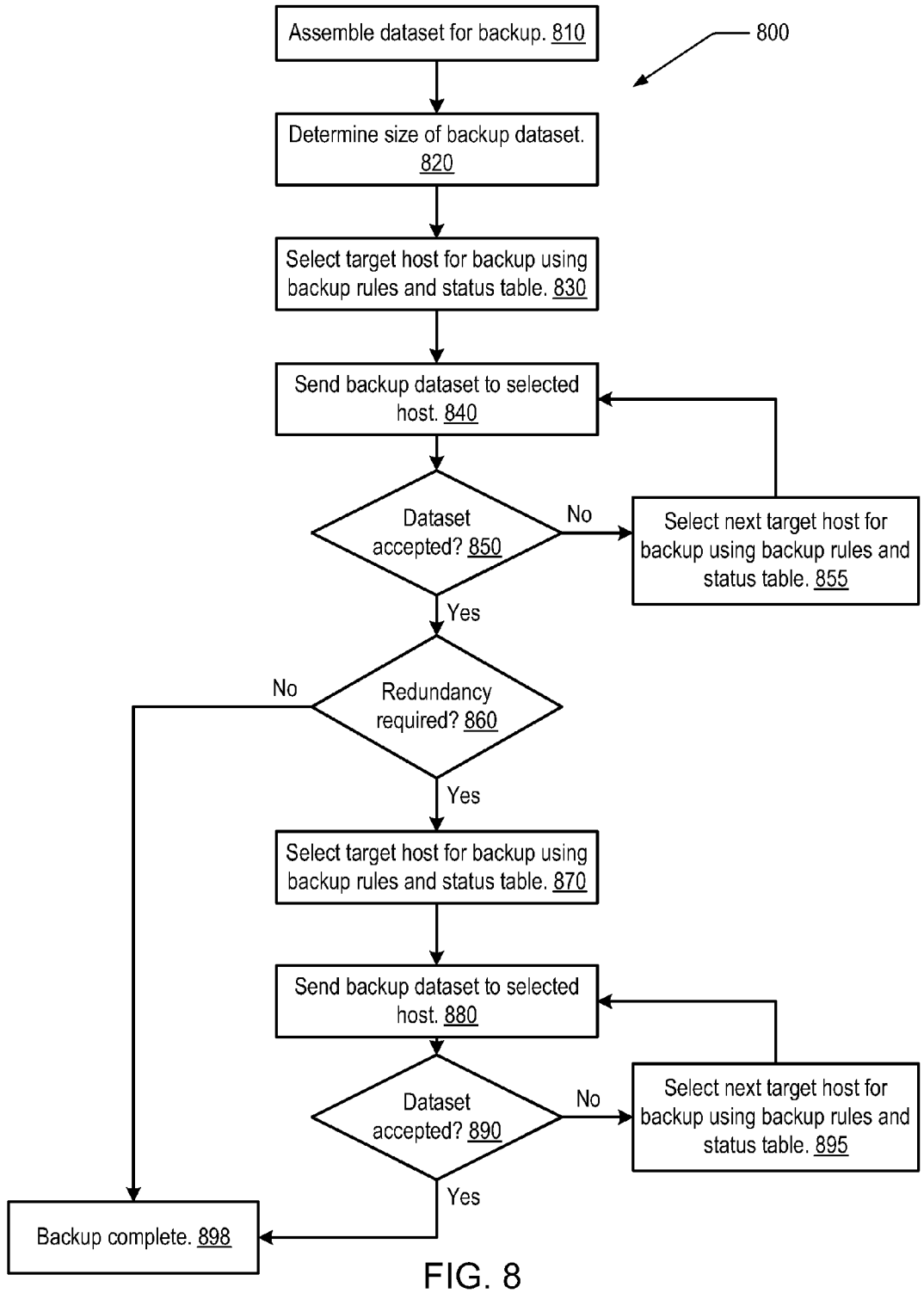
FIG. 8 illustrates one embodiment of a process that may be used to backup data in a peer-to-peer network of hosts using single-instance storage techniques.

FIG. 8 illustrates one embodiment of a process 800 that may be used to backup data in a peer-to-peer network of hosts using single-instance storage techniques. Process 800 may begin with the assembly of a dataset for backup (block 810). Once the dataset is assembled, its size may be determined (block 820). For instance, a host that assembles a dataset may segment the dataset and count the number of data segments to be backed up. Next, a host may be selected as a backup target based on a set of backup rules and the status of each host in a peer group (block 830). For example, in one embodiment a rule may specify that a dataset must be stored on a server-class host. Another rule may specify that the target host be in the same IP subnet as the host from which the dataset originates. Using these or any of a variety of other rules along with status information including each host's available storage capacity, a target host may be selected. The backup dataset may then be sent to the selected host (block 840). If the target host does not accept ownership of the backup dataset (decision block 850), then another target host may be selected (block 855) and block 840 may be repeated. If the target host accepts ownership of the backup dataset (decision block 850), and if redundancy is not required for data backed up on the target host (decision block 860), then the backup operation is complete (block 898). In one embodiment, whether or not redundancy is required may be determined by consulting a status table that includes host attributes as described above. If the target host accepts ownership of the backup dataset (decision block 850), and if redundancy is required for data backed up on the target host (decision block 860), then a secondary host may be selected as a backup target based on a set of backup rules and the status of each host in a peer group (block 870). The backup dataset may then be sent to the selected secondary host (block 880). If the target secondary host does not accept ownership of the backup dataset (decision block 890), then another target secondary host may be selected (block 895) and block 880 may be repeated. If the target host accepts ownership of the backup dataset (decision block 890), then the backup operation is complete (block 898).

Figure 9:
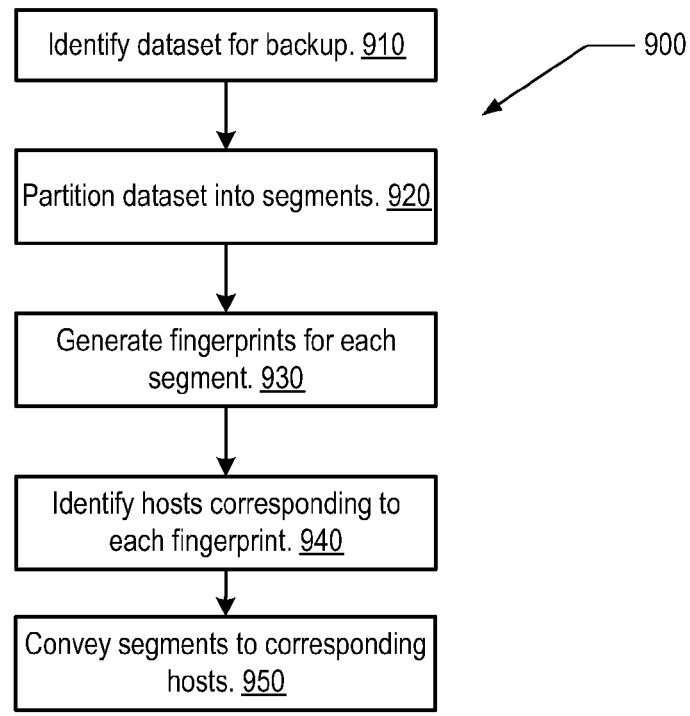
FIG. 9 illustrates one embodiment of a process that may be used to backup data in a network.

In the example of FIG. 8, it may appear that all data for a given data set is backed up to a single host. However, this is not necessarily the case. Rather, data for a given dataset may be distributed across a number of hosts in a backup operation. FIG. 9 illustrates such an embodiment. As shown, a host may identify a particular dataset for backup (block 910). The host may then partition the dataset into data segments (block 920) and generate a fingerprint for each of the segments (block 930). Each fingerprint may then be used to identify a host which is responsible for the corresponding portion of the distributed hash table (block 940). As described, the portion of the distributed hash table each host is responsible for may have been previously negotiated. The data segments may then be conveyed to the target hosts identified by the corresponding fingerprints (block 950). In this manner, data segments of the dataset may be distributed across a plurality of peer hosts in a manner similar to that of the hash table.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:

a plurality of interconnected hosts including at least one peer group that includes two or more member hosts of the hosts;

wherein members of the peer group are configured to:
 share resources with other members of the peer group;
 store backup data for other members of the peer group; and
 maintain at least a portion of a distributed hash table corresponding to the backup data;

wherein a first host of the hosts that is not a member of the peer group is configured to negotiate for membership of the first host in the peer group, whereby the first host is configured to:
 send a request for attributes of each member of the peer group, wherein the attributes include at least an available storage capacity;
 receive one or more responses to the request, wherein said responses include an indication as to what portion of a distributed hash table is maintained by each member of the peer group;
 determine a proposal for the first host to become a member of the peer group based at least in part on the one or more responses, the proposal including an offer to maintain at least a portion of a distributed hash table corresponding to the backup data;
 send the proposal to members of the peer group;
 receive one or more responses to the proposal;
 in response to determining the received one or more responses from the hosts satisfy given membership rules, the first host is configured to:
  become a member of the peer group, thereby forming a new peer group;
  share resources with other members of the new peer group;
  store backup data for other members of the new peer group; and
  maintain at least a portion of a distributed hash table corresponding to the backup data.

2. The system as recited in claim 1, wherein the first host is further configured to:
   identify a rating which indicates how frequent the first host is connected to the new peer group;
   in response to detecting the rating is above a given threshold, de-duplicate the backup data stored on the first host against backup data stored on other members of the new peer group, wherein one copy of the de-duplicated backup data is stored within the new peer group; and
   in response to detecting the rating is below the given threshold, de-duplicate the backup data stored on the first host against backup data stored on other members of the new peer group, wherein two copies of the de-duplicated backup data is stored within the new peer group.

3. The system as recited in claim 2, wherein to determine the proposal for participation, the first host is further configured to calculate said portion of the distributed hash table to maintain based at least in part on said responses from the other members of the peer group.

4. The system as recited in claim 2, wherein the first host is further configured to:
   maintain status information indicating an available storage capacity for each member of the peer group; and
   select a member to which to convey backup data for storage based at least in part on the status information.

5. The system as recited in claim 2, wherein at least a subset of the distributed hash table includes data identifying two members of the peer group storing said two copies of the de-duplicated backup data.

6. The system as recited in claim 2, wherein attributes for each member of the peer group further include at least one of the following: a type of computer, an internet protocol (IP) subnet, and said rating.

7. The system as recited in claim 2, wherein the distributed hash table comprises a plurality of entries, each entry corresponding to a data segment fingerprint that unambiguously identifies a corresponding data segment of a plurality of data segments within said backup data.

8. A method for storing backup data in a peer-to-peer group within a plurality of interconnected hosts, the method comprising:
   members of the peer group performing:
     sharing resources with other members of the peer group;
     storing backup data for other members of the peer group; and
     maintaining at least a portion of a distributed hash table corresponding to the backup data;
   a first host of the plurality of interconnected hosts negotiating for membership in the peer group, the first host of the hosts not being included within the peer group, wherein negotiating includes the first host:
     sending a request for attributes of each member of the peer group, wherein the attributes include at least an available storage capacity;
     receiving one or more responses to the request, wherein said responses include an indication as to what portion of a distributed hash table is maintained by each member of the peer group;
     determining a proposal for the first host to become a member of the peer group based at least in part on the one or more responses, the proposal including an offer to maintain at least a portion of a distributed hash table corresponding to the backup data;
     sending the proposal to members of the peer group;
     receiving one or more responses to the proposal;
   in response to determining the received one or more responses from the hosts satisfy given membership rules, the first host:
     becoming a member of the peer group, thereby forming a new peer group;
     sharing resources with other members of the new peer group;
     storing backup data for other members of the new peer group; and
     maintaining at least a portion of a distributed hash table corresponding to the backup data.

9. The method as recited in claim 8, further comprising the first host:
   identifying a rating, which indicates how frequent the first host is connected to the new peer group;
   in response to detecting the rating is above a given threshold, de-duplicating the backup data stored on the first host against backup data stored on other members of the new peer group, wherein one copy of the de-duplicated backup data is stored within the new peer group; and
   in response to detecting the rating is below the given threshold, de-duplicating the backup data stored on the first host against backup data stored on other members of the new peer group, wherein two copies of the de-duplicated backup data is stored within the new peer group.

10. The method as recited in claim 9, wherein to determine the proposal for participation, the method further comprises calculating said portion of the distributed hash table to maintain based at least in part on said responses from the other members of the peer group.

11. The method as recited in claim 9, further comprising the first host:
   maintaining status information indicating an available storage capacity for each member of the peer group; and
   selecting a member to which to convey backup data for storage based at least in part on the status information.

12. The method as recited in claim 9, wherein at least a subset of the distributed hash table includes data identifying two members of the peer group storing said two copies of the de-duplicated backup data.

13. The method as recited in claim 9, wherein attributes for each member of the peer group further include at least one of the following: a type of computer, an internet protocol (IP) subnet, and said rating.

14. The method as recited in claim 9, wherein the distributed hash table comprises a plurality of entries, each entry corresponding to a data segment fingerprint that unambiguously identifies a corresponding data segment of a plurality of data segments within said backup data.

15. A computer readable storage medium storing computer instructions that are executable by a processor to cause a first host within a plurality of interconnected hosts and not included within a peer group to:
   negotiate for membership in the peer group within the plurality of interconnected hosts, the first host of the hosts not being included within the peer group, wherein instructions for negotiating are configured to cause the first host to:
     send a request for attributes of each member of the peer group, wherein the attributes include at least an available storage capacity;
     receive one or more responses to the request, wherein said responses include an indication as to what portion of a distributed hash table is maintained by each member of the peer group;
     determine a proposal for the first host to become a member of the peer group based at least in part on the one or more responses, the proposal including an offer to maintain at least a portion of a distributed hash table corresponding to the backup data;

send the proposal to members of the peer group;

receive one or more responses to the proposal;

in response to determining the received one or more responses from the hosts satisfy given membership rules:

become a member of the peer group, thereby forming a new peer group;

share resources with other members of the new peer group;

store backup data for other members of the new peer group; and maintain at least a portion of a distributed hash table corresponding to the backup data.

16. The computer readable storage medium as recited in claim 15, wherein the instructions are further executable to cause the first host to:

identify a rating, which indicates how frequent the first host is connected to the new peer group;

in response to detecting the rating is above a given threshold, de-duplicate the backup data stored on the first host against backup data stored on other members of the new peer group, wherein one copy of the de-duplicated backup data is stored within the new peer group; and in response to detecting the rating is below the given threshold, de-duplicate the backup data stored on the first host against backup data stored on other members of the new peer group, wherein two copies of the de-duplicated backup data is stored within the new peer group.

17. The computer readable storage medium as recited in claim 16, wherein to determine the proposal for participation, the instructions are further configured to calculate the portion of the distributed hash table to maintain based at least in part on said responses from the other members of the peer group.

18. The computer readable storage medium as recited in claim 16, wherein the instructions are further executable to cause the first host to:

maintain status information indicating an available storage capacity for each member of the peer group; and select a member to which to convey backup data for storage based at least in part on the status information.

19. The computer readable storage medium as recited in claim 16, wherein at least a subset of the distributed hash table includes data identifying two members of the peer group storing said two copies of the de-duplicated backup data.

20. The computer readable storage medium as recited in claim 19, wherein attributes for each member of the peer group further include at least one of the following: a type of computer, an internet protocol (IP) subnet, and said rating.

* * * * *